United States Patent [19]

Byer et al.

[11] 4,172,663
[45] Oct. 30, 1979

[54] OPTICAL WAVELENGTH METER

[75] Inventors: Robert L. Byer, Stanford; Jeffrey A. Paul, Torrance, both of Calif.

[73] Assignee: Board of Trustees Leland Stanford Jr., University, Stanford, Calif.

[21] Appl. No.: 791,500

[22] Filed: Apr. 27, 1977

[51] Int. Cl.² .................... G01B 9/02; G01J 3/26
[52] U.S. Cl. ............................. 356/352; 356/346
[58] Field of Search ............... 356/106 R, 106 S, 112

[56] References Cited

U.S. PATENT DOCUMENTS 4,084,907  4/1978  Pinard et al. .................. 356/106 S

OTHER PUBLICATIONS

Meissner; K. W., "Interference Spectroscopy", Jr. Optical Soc. America, 6-1941, pp. 405-427.

*Primary Examiner*—John K. Corbin
*Assistant Examiner*—Wm. H. Punter
*Attorney, Agent, or Firm*—Harry E. Aine

[57] ABSTRACT

In an optical wavelength meter, the wavelength of light to be measured, such as that obtained from a CW or pulsed laser, is directed through a tunable grating monochromator, serving as a bandpass filter, for passing light within the selected bandpass and determining, to the lowest degree of resolution, the wavelength of the light to be measured. Thence, the light is directed sequentially through a plurality of Fabry-Perot etalon interferometers of increasing degree of resolution. The interference patterns are sequentially directed onto a spatial detector. The radii of the first and second rings of the respective interference patterns are measured to derive fractional fringe order measurements of successively higher resolution, such that the wavelength of the light to be measured is determined in successively increasing steps of higher resolution. In a typical example, utilizing three Fabry-Perot etalons the wavelength of the light to be measured at, for example, 6328 angstroms is determined to be an absolute accuracy of ±200 megahertz.

9 Claims, 5 Drawing Figures

Fig_1

Fig. 2

Fig_3

Fig_4

Fig-5

OPTICAL WAVELENGTH METER

The U.S. Government has certain rights in this invention pursuant to Contract No. DAAG 29-74-C-0033 award by the U.S. Army Research Office.

BACKGROUND OF THE INVENTION

The present invention relates in general to optical wavelength meters and more particularly to such meters employing Fabry-Perot etalons for producing interference fringe patterns having a spatial period of the brightness lines related to the wavelength of the light to be measured.

DESCRIPTION OF THE PRIOR ART

Heretofore, Fabry-Perot etalon interferometers have been employed for reducing interference fringe patterns of light to be measured so that the wavelength of the light could be determined from the radial spacings of first and second concentric rings of the interference fringe pattern. Such an optical wavelength meter is described in a text titled "Fundamentals of Optics" published by McGraw-Hill, Inc. in 1957, see Pages 270-284.

One problem with these prior art interferometers has been that they have had relatively low resolution and have not been suitable for measuring the wavelength of pulsed sources, such as a pulsed laser. In the past, when measuring the wavelength of light derived from a pulsed laser, the spatial period of the interference pattern was measured over many pulses. As a result, it was not possible to ascertain the wavelength of light derived from a given pulse because the wavelength, quite often, varies from pulse to pulse in a pulsed laser. The prior art technique merely gave a reading of the mean wavelength of a train of pulses.

Therefore, it is desired to provide an improved optical wavelength meter capable of providing improved resolution and being suitable for measuring the wavelength of light emitted during only a single or at most a few pulses of a pulsed laser.

SUMMARY OF THE PRESENT INVENTION

The principal object of the present invention is the provision of an improved optical wavelength meter, and more particularly, the provision of such a meter having increased resolution and capable of measuring the wavelength of a pulsed source during only one or at most a few pulses from the source.

In one feature of the present invention, light, the wavelength of which is to be measured, is directed through a plurality of Fabry-Perot etalons of increasing resolution for producing interference patterns of increasing resolution. The period of the respective patterns being such that the wave number or wavelength derived from a lower resolution etalon may be employed for determining the lower resolution component of the wavelength measurement derived from the next higher resolution interferometer.

In another feature of the present invention, the mirrors of the Fabry-Perot etalon interferometers are spaced apart precisely and a gas fill of a refractive index and at a subatmospheric pressure is provided between the mirrors, the pressure being adjusted so that slight errors in the spacing between the mirrors is compensated by the gas fill.

In another feature of the present invention, the axially spaced mirrors of the Fabry-Perot etalon interferometer are enclosed in a thermally conductive housing so as to provide a substantially isothermal environment for the mirrors of the etalon.

In another feature of the present invention, the spatial detector for detecting the spatial period of the interference pattern comprises an array of photodiodes so that the detector array is sensitive to a pulsed source of light to be measured.

In another feature of the present invention, a monochromator is employed as a bandpass filter for passing the light to be measured to the Fabry-Perot etalon interferometers so that a lower resolution component of the measurement of the wavelength of the light is determined by the setting by the bandpass characteristic of the monochromator.

Other features and advantages of the present invention will become apparent upon a perusal of the following specification taken in connection with the accompanying drawings wherein:

DESCRIPTION OF THE PREFERRED EMBODIMENTS

Figure 1:
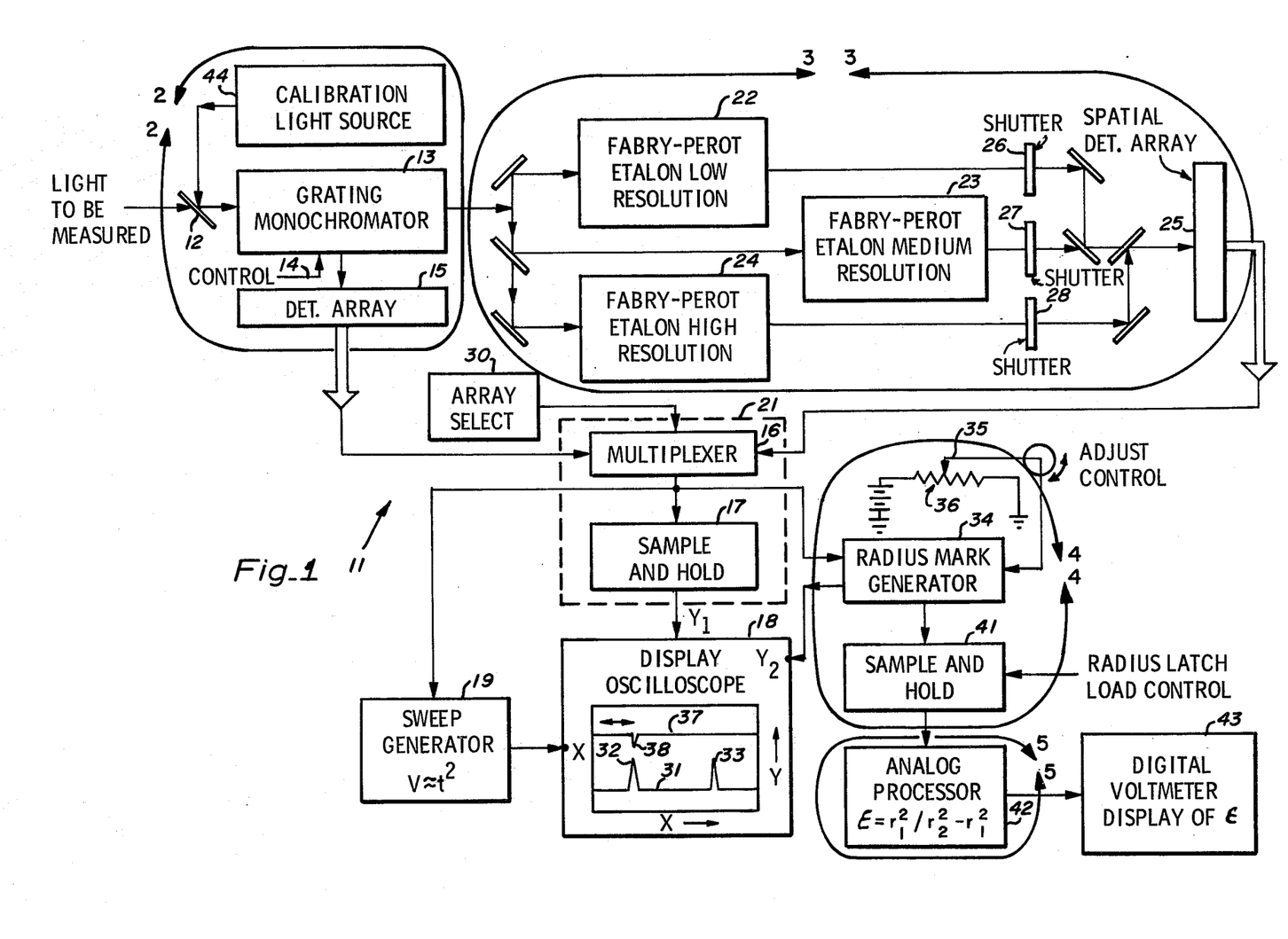
FIG. 1 is a schematic circuit diagram, partly in block diagram form, of an optical wavelength meter incorporating features of the present invention.

Referring now to FIG. 1, there is shown the optical wavelength meter 11 incorporating features of the present invention. In the wavelength meter 11, light, the wavelength of which is to be measured, is fed through a half-silvered mirror 12 and into a grating monochromator 13 having a control 14 for setting the bandpass wavelength of the monochromator 13. In a typical example, the grating monochromator has a resolution of ±2 wave numbers, where the wave number is equal to the inverse of the wavelength λ in centimeters.

A photodiode detector array 15 is arranged to detect the bandpass spectrum of the monochromator 13. The diodes of the array 15 are sequentially sampled and their signal levels held by means of a multiplexer 16 and sample and hold circuit 17. The output of the sample and hold circuit 17 serves as a video output signal which is fed to the vertical deflection plates of a display oscilloscope 18 for display as a function of a sweep signal derived from sweep generator 19 having an output sweep voltage which is proportional to the square of time t.

The synchronizing pulse for starting of the sweep generator 19 is derived from the multiplexer and sample and hold circuits 16 and 17, such circuits 16 and 17 are commercially available as a Model RC-100A series circuit board from Reticon Corp. of 910 Benecia Ave., Sunnyvale, CA, for use with Reticon Model C, EC, G and H series photodiode arrays, such as photodiode array 15.

A second light beam output, within the bandpass of the grating monochromator, is fed to a plurality of Fabry-Perot etalon interferometers 22, 23, and 24 of successively increasing resolution. The details of these interferometers 22-24 are more clearly shown with regard to FIG. 3. The output of each of the Fabry-Perot etalons 22-24 is an interference fringe pattern of brightness lines which are then directed and focused onto a second spatial detector array of photodiodes 25, which can be identical to the first detector array 15. A plurality of shutters 26, 27 and 28 are provided in each of the optical paths between the respective Fabry-Perot etalons and the detector array 25 so that the operator may successively direct the respective interference pattern onto the spatial detector array 25 by merely opening or closing the proper shutters.

The resolutions of the respective Fabry-Perot etalons 22-24 are arranged so that a wave number measurement derived from an interference pattern of the lowest resolution etalon 22 may be employed for determining the lower resolution component of the wave number derived from the interference pattern of the next higher resolution etalon 23 and so on. For example, the wave number derived from the medium resolution etalon 23 is employed as the lower resolution component of the wave number derived from the high resolution Fabry-Perot etalon 24.

The output of the spatial detector array 25 is fed to a second input of the multiplexer 16 and an array select 30 selects the respective detector array 15 or 25. When the multiplexer is connected to the spatial detector array 25, the output of the sample and hold 17 is a video signal representative of the interference ring pattern of brightness lines of the selected Fabry-Perot etalon.

In a typical wavelength measurement, the Fabry-Perot etalon 22 of lowest resolution is selected by opening shutter 26 and the video output signal from the sample and hold 17 is displayed on the display oscilloscope 18 and shown as the lower trace 31 displayed thereon. The trace 31 includes the first and second rings of the selected interference pattern, the rings being shown as peaks 32 and 33, respectively, in the trace 31. A radius mark generator 34, more fully disclosed below with regard to FIG. 4, includes a manual adjustment control 35 which changes the position of a pick-off on a potentiometer circuit 36 to derive an output which is fed to a second trace 37 of the display oscilloscope 18. This second trace has a marker pip 38 which is movable along the direction of the horizontal trace 37 so that the pip can be brought into vertical registration over either of the two ring peaks 32 and 33 of the interference pattern display trace 31. The horizontal distance from the beginning of the respective traces 31 and 37 to the respective peaks 32, and 33 is a measure of the radii of the peaks of the interference pattern. The sweep generator 19 and radius mark generator 34 are both synchronized from the multiplexer and sample and hold circuit 21.

In operation, the operator adjusts the control of the radius mark generator to first bring the marker pip 38 of the radius mark generator trace 37 into vertical alignment with the first peak 32 of the interference ring pattern trace 31. When vertical registration is obtained, the operator depresses a radius latch load control switch 40 which provides an input to a sample and hold 41 (latch) to sample and hold a signal of a value corresponding to the radius of the first ring 32 of the interference pattern. The operator then adjusts the control 35 on the radius mark generator to bring the radius mark pip 38 into vertical registration with the second ring 33 of the interference trace pattern 31. When registration is obtained, the operator again presses the radius latch load control for sampling and holding the second output of the radius mark generator corresponding to the radius of the second ring 33 of the interference pattern. These two outputs derived from the sample and hold 41 are fed into an analog processor 42 which performs the algorithm:

$$\epsilon = r_1^2/r_2^2 - r_1^2 \qquad \text{(Eq. 1)}$$

The output $\epsilon$ corresponds to the fractional fringe order component of the wave number to be derived from the respective Fabry-Perot etalon. The $\epsilon$ output signal of the analog processor 42 is fed to a digital voltmeter display 43 for display of the fractional fringe order number. This fractional fringe order number is employed in a simple calculation to derive the wave number or wavelength of the light to be measured, as determined by the respective etalon. The wave number derived from the low resolution etalon 22 is employed as the low resolution component in the calculation of the wave number derived from the next higher resolution Fabry-Perot etalon 23. The wave number output derived from the medium resolution Fabry-Perot etalon 23 is employed as the lower resolution component of the wave number measurement derived from the highest resolution Fabry-Perot etalon 24.

The optical wavelength meter 11 is calibrated by means of a calibration light source 44, such as a helium neon laser, having an output line of precisely predetermined wavelength which is fed into the optical wavelength meter in lieu of the light beam to be measured via a half-silvered mirror 12 for calibration of the various wavelength determinative elements of the meter 11, such as the etalons 22-24, detector arrays 15 and 25, radius mark generator circuit 34, and analog processor 42.

In a typical example of a wavelength measurement, the grating monochromator 13 is adjusted via control 14 so that the spectral line of interest is within the center of the passband of the monochromator 13 and the reading of the wave number from the monochromator is read, for example, as 20,002±2 wave numbers, hereinafter referred to as the base wave number. After this first measurement, the lowest resolution Fabry-Perot etalon interferometer 22 is selected and the radius mark generator 34 is adjusted via control 35 for reading out the radii of the first and second rings of the interference pattern trace 31 to derive a fractional fringe order wavenumber $\epsilon$.

The low resolution wave number $\nu_1 =$ $$(\text{base wave number}/\text{FSR} + \epsilon) \text{ FSR} \qquad \text{(Eq. 2)}$$

where FSR is the free spectral range of the respective etalon, and is defined by $$FSR_{H_3} = c/2nl \qquad \text{(Eq. 3)}$$

or FSR $(\text{cm}^{-1}) = \frac{1}{2}nl$ where c is the velocity of light, n is the refractive index of the space between the mirrors of the etalon and l is the spacing between the mirrors of the etalon.

For the low resolution wave number etalon, assume $FSR_1 = 10$ cm$^{-1}$ or 10/cm or 10 wavenumbers and assume $\epsilon_1 = 0.22 \pm 0.04$, then $$\nu_1 = (\frac{20,000.0}{10} + 0.22 \pm 0.04)10$$

$$\nu_1 = 20,002.2 \pm 0.4$$

For the medium resolution etalon, assume $FSR_2 = 1$ wavenumber and assume $\epsilon_2 = 0.22 \pm 0.04$, then $$\nu_2 = (\frac{20,002.0}{1} + 0.22 \pm 0.04)1$$

$$\nu_2 = 20,002.22 \pm 0.04$$

For the high resolution etalon, assume $FSR_3 = 0.1$ wavenumber and assume $\epsilon_3 = 0.1 \pm 0.04$, then $$\nu_3 = (\frac{20,002.2}{0.1} + 0.1 \pm 0.04)0.1$$
$$\nu_3 = (200,022.0 + 0.1 \pm 0.04)0.1$$
$$\nu_3 = 20,002.21 \pm 0.004$$

Figure 2:
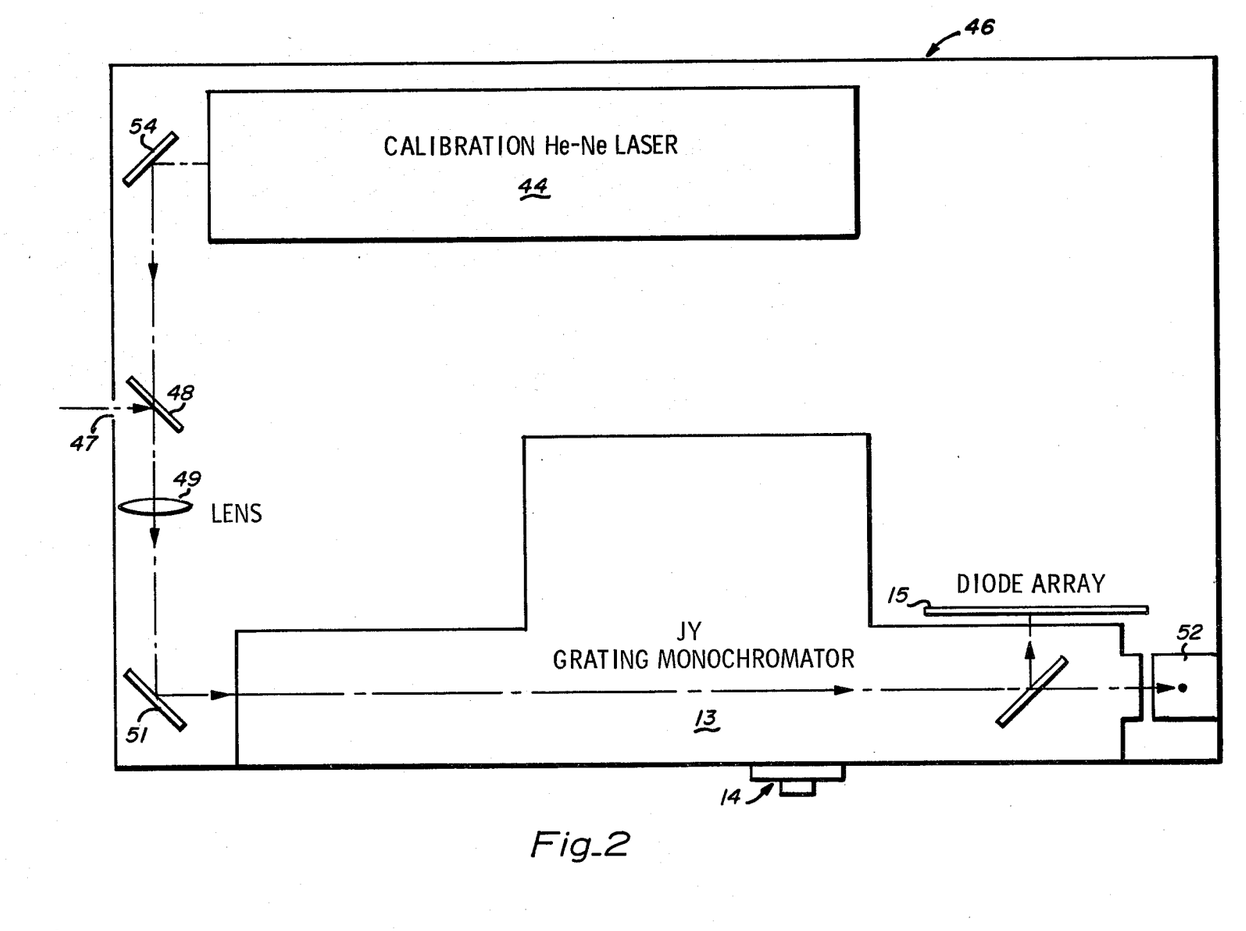
FIG. 2 is a plan view of a physical implementation of that portion of the structure of FIG. 1 delineated by line 2—2.

Referring now to FIG. 2 there is shown, in plan view, a first or input deck of the optical wavelength meter 11 as indicated in that portion of the structure of FIG. 1 delineated by line 2—2. Light to be measured enters a housing 46 through an aperture 47 and is reflected from a mirror 48 through a lens 49 onto a second mirror 51, and thence focused into the input of the JY grating monochromator 13. One output of the monochromator 13 is directed into the first diode array 15 whereas a second output of the monochromator, namely a bandpass portion thereof, is directed onto a mirror 52 and reflected upwardly to a second deck 53 shown in plan view in FIG. 3.

In addition, the input or lower deck includes a calibration helium-neon laser 44 forming the calibration light source. The output light beam of the calibration light source 44 is directed onto a mirror 54 and thence through the input mirror 48 into the input of the grating monochromator for calibration of the optical wavelength meter 11. A dial 14 is provided for adjustment of the bandpass of the grating monochromator 13 and the reading thereof serves as the base wave number, $\nu_0$.

Figure 3:
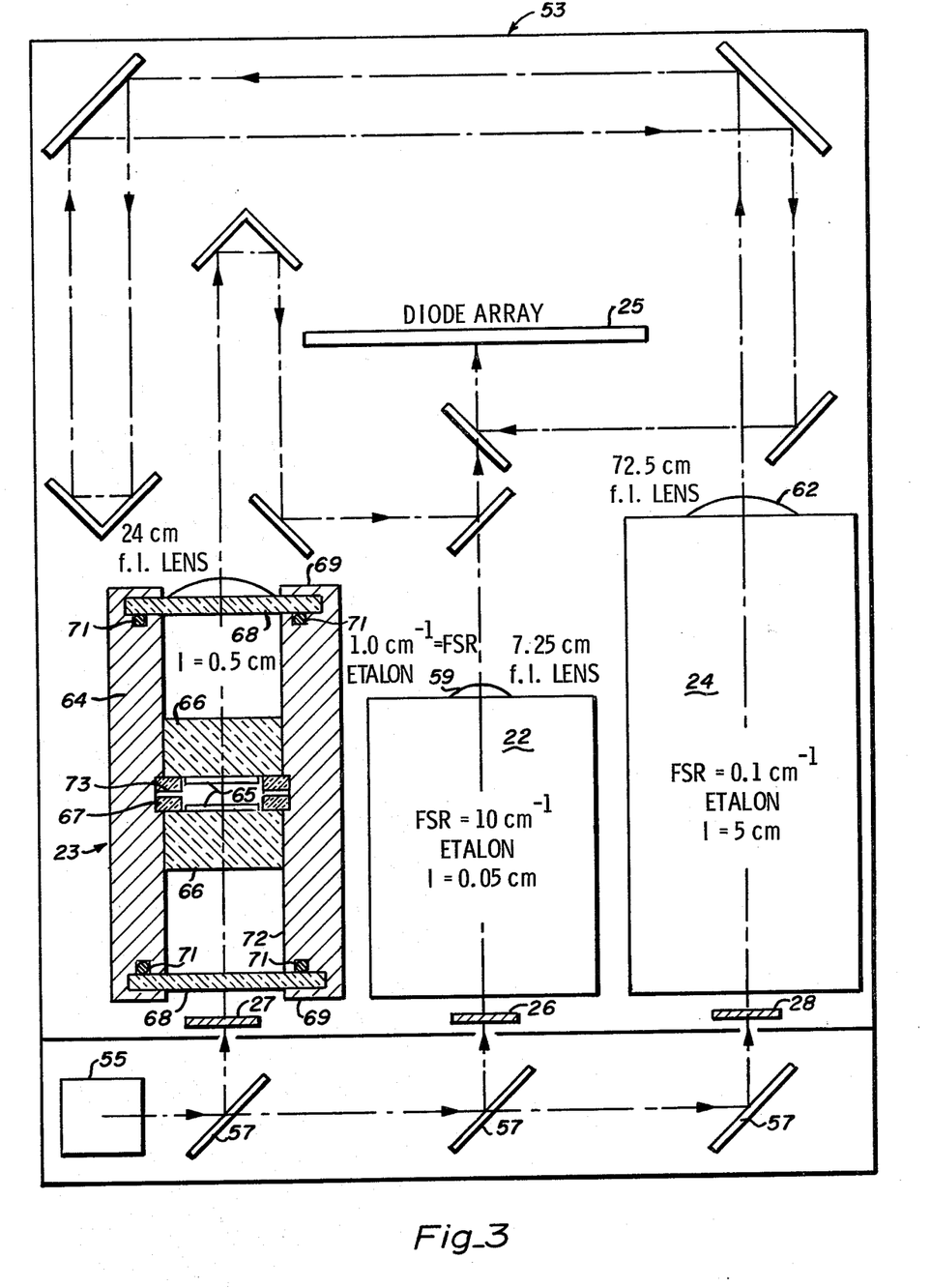
FIG. 3 is a plan view of a physical realization for that portion of the structure of FIG. 1 delineated by line 3—3.

Referring now to FIG. 3, the beam of light to be measured as reflected into the second deck 53 is reflected from a mirror 55 along a path 56 having a plurality of half-silvered mirrors 57 disposed therealong for reflecting portions of the light beam to be measured into respective ones of the etalons 22, 23 and 24. Shutters 26, 27 and 28 are disposed in the reflected beam paths in front of each of the etalons. The output beams from the respective etalons are focused via lenses 59, 61 and 62 onto the diode array 25. The optics are arranged and calibrated so that the center of the respective circular interference fringe patterns are in registration with the first diode of the diode array 25.

In a typical example, the diode array 25 comprises an array of 256 photodiodes precisely spaced apart along the length of the array. Such an array of photodiodes is commercially available from Reticon Corp. of the aforecited address as Model RL-128EC. The focal lengths of the interference patterns as derived from the respective etalons varies from 7.25 cm for the low resolution etalon 22 to 72.5 cm for the high resolution etalon 24. The optical paths for the respective etalons are folded back and forth between mirrors, as shown, to accommodate the relatively long focal lengths.

Each of the etalons 22-24 comprises a realtively rigid thermally conductive housing 64, such as an elongated aluminum cylinder having a wall thickness of ⅛ inch and a diameter as of 2 inches. The etalon includes a pair of parallel partially transmissive planar mirrors 65 precisely spaced apart by the distance l. In a typical example the mirrors are formed by silver coatings placed upon fused silica cylindrical substrate members 66. The spacing l between the mirrors 65 is precisely determined by an annular fused silica spacer 67 ground to a precise axial length and provided with optically flat end surfaces for optically contacting the opposed surfaces of the fused silica mirrors 66. The fused silica spacer 67 has a slightly greater diameter than the fused silica mirrors 66 and the spacer 67 is bonded at its outer periphery to the inside wall of the cylindrical housing 64.

Opposite ends of the cylindrical housing 64 are closed off via planar windows 68 retained onto the end of the cylinders via retaining rings 69 and the windows are sealed in a gas tight manner to the ends of the housing 64 via O-ring seals 71. The interior bore 72 of the housing 64 is evacuated to a relatively low pressure, as of a few torr, and filled with a gas such as argon having a desired refractive index so that by adjusting the pressure of the gas, compensation can be obtained for slight errors in the precise spacing of the mirrors 65. The gas fill within the bore 72 communicates with the space between the mirrors 65 via a radial passage 73 in the annular spacing 67 communicating with an axially directed groove in the inside wall of the housing 64. In the case of the $FSR = 1.0$ cm$^{-1}$ etalon 23, the spacing l between the mirrors 65 is precisely set of $0.50000 \pm 0.00001$ cm. The thermally conductive housing 64 provides a substantially isothermal environment for the mirrors 65 so that the optical wavelength meter is rendered relatively insensitive to ambient temperature fluctuations.

As an alternative to the use of the diode array detector 25, a vidicon tube for sensing visible light out to one micron wavelength or a PbS plumbicon tube may be employed for monitoring visible light out to 2 micron wavelength. The silver coatings for the mirrors 65 are inexpensive, broadband reflective coatings 400 angstroms thick which provide useful reflectivity over a 0.4 to beyond 2 micron spectral range. The interferometer flats are polished to $\lambda/50$ at sodium yellow wavelengths so that the limiting interferometer finesse is 25 in the visible range. The interferometer spacings l are 0.5 millimeters, 0.5 cm and 5.0 cm within a quarter wavelength of visible light. Thus, the free spectral ranges are 10 cm$^{-1}$, 1 cm$^{-1}$, and 0.1 cm$^{-1}$ or 300 gigahertz, 30 gigahertz, and 3 gigahertz, respectively. The resolutions are therefore, 20 gigahertz, 2 gigahertz, and 0.2 gigahertz for a measured finesse of 15 at 6328 angstroms. The resolution is thus $2.5 \times 10^6$ for the highest resolution interferometer 24. This is an absolute resolution since the interferometers 22, 23 and 24 are essentially vacuum enclosed.

The optical wavelength meter 11 allows complete spectral readout on a single laser pulse due to the storage effect of the diode array 25. This offers a significant advantage over previous wavelength meters which scan in time and require a large number of pulses to complete a spectrum. Actually at least three pulses from the laser are required but assuming that the pulse jitter does not exceed the free spectral range of the highest resolution etalon 24 the jitter from pulse to pulse can be determined from individual pulses once the wavelength meter has been set for monitoring the pulses of the laser, i.e., the lower resolution wave numbers have been determined and it is only necessary to compute the fractional fringe order number of the high resolution etalon 24. This measurement can be obtained from a single laser pulse. Of course, if three separate detector arrays 25 were to be employed, one for each of the Fabry-Perot etalons 22–24, the wavelength meter 11 would determine the wavelength with only a single laser pulse.

Figure 4:
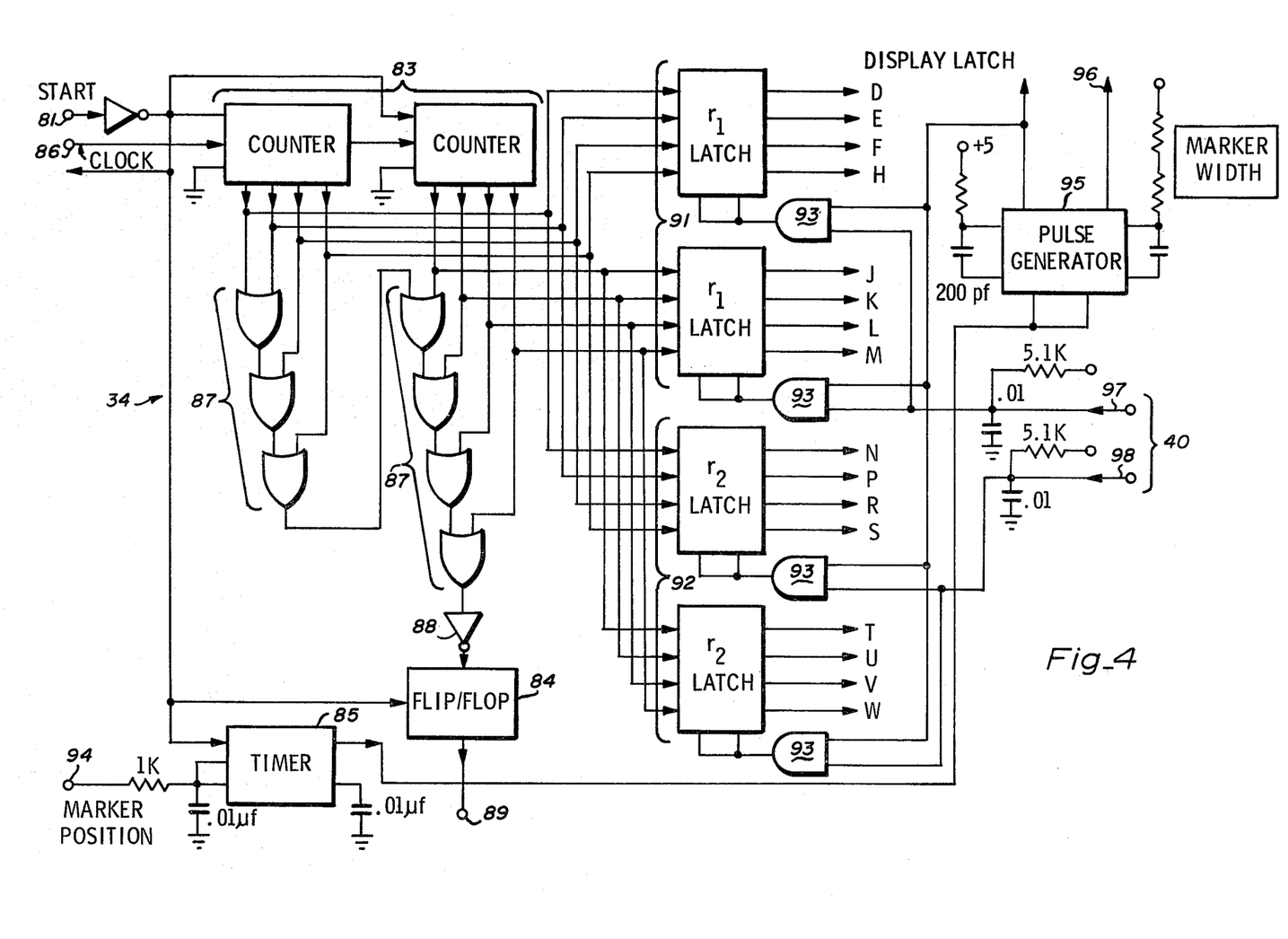
FIG. 4 is a schematic circuit diagram for a radius marker generator portion of the structure of FIG. 1 delineated by line 4—4.

Referring now to FIG. 4, there is shown the radius mark generator circuit. The radius mark generator circuit 34 operates synchronously with the multiplexer and sample and hold circuit collectively identified as 21 utilizing the timing signals generated within the circuit 21. The START pulse derived from circuit 21 is routed through input terminal 81 and serves to reset the radius mark generator circuit and prepare it for the scan sequence to follow. The START signal derived from input terminal 81 is fed through an inverting amplifier 82 and into the input of an 8-bit binary counter 83 to count the clock pulses generated from circuit 21 and applied to the counter 83 via input terminal 86.

The START pulse presets the counter 82 to 11111110. This guarantees that the first video sample corresponds to a counter content of 00000001. The START pulse also resets a flip-flop 84 and triggers a timer 85 run as a monostable circuit. After the termination of the START pulse, the clock pulses received on terminal 86 advance the counter 83. When the counter content is 00000000, cascaded OR gates 87, coupled to the output of the counter 83, combine with inverting amplifier 88 to form a gate which makes the clock input of flip-flop 84 HIGH. On the next clock pulse, this signal will fall, toggling the flip-flop 84 and making the signal on output 89 go HIGH which will be used to trigger the sweep generator 19.

The output content of the counter 83 is fed to two separate 8-bit latches 91 and 92. These latches 91 and 92 will accept the counter content only when the output of gates 93 are HIGH. Since each of the 255 possible counter spaces corresponds to a sampled diode in the array 25, and each of these diodes corresponds to a unique spatial value, the corresponding counter content will be directly related to the radii of a given point of the fringe pattern 31.

Monostable timer circuit 85, which was triggered on the START pulse, will have a pulse width determined by the resistance of the potentiometer 36 coupled to input terminal 92 via the radius marker adjust control 35. When the timer 84 times out, a pulse generator 95, coupled to the output of the timer 85, is triggered and produces two short pulses. One of these pulses derived on output terminal 96 is sent to the oscilloscope display 18 to provide the marker pulse 38 to show which diode of the array is being sampled when the timer 85 times out. The other pulse from the pulse generator 95 is applied to the latch gates 93. If either inputs derived on input terminals 97 or 98 and fed to gates 93 is high at the time of this pulse, the two corresponding latches 91 and 92 will accept the counter content. Therefore, the two 8-bit latches 91 and 92 can be loaded independently by the radius latch loading control signals applied to input terminals 97 and 98 and corresponding to the radius latch load control input to the sample and hold circuit 41 of FIG. 1. In this manner, the radius marker 38 is first set over the first video fringe peak 32 and that value loaded in one register 91 by the input applied to input terminal 97. Then the procedure is repeated for the second fringe peak 33 with the second video fringe peak value being loaded in the second register 92 via the load control input applied via input terminal 98. Now, the two 8-bit latches 91 and 92 contain all the necessary spatial information to compute the fractional fringe order $\epsilon$.

Figure 5:
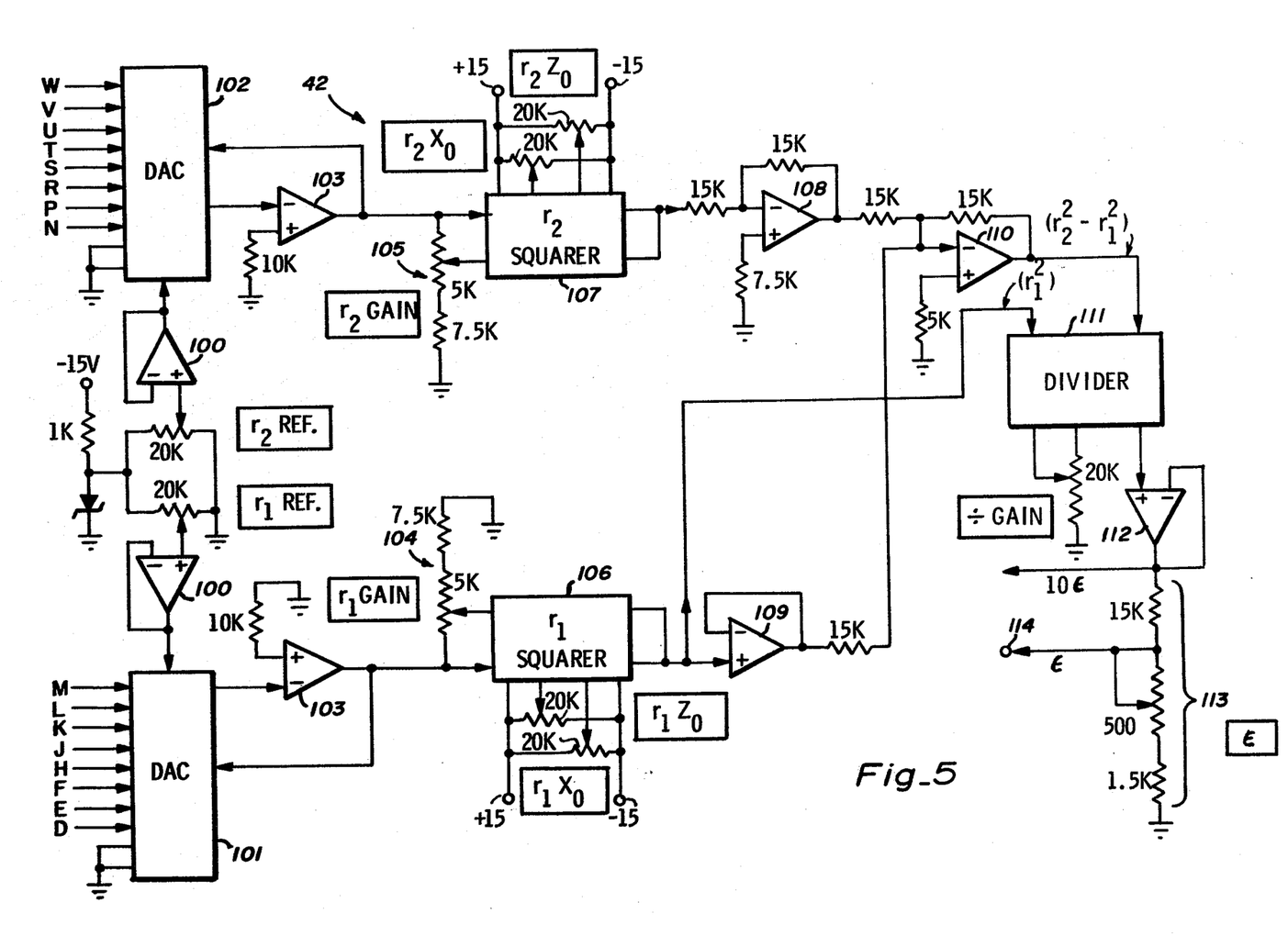
FIG. 5 is a schematic circuit diagram for the analog processor portion of the structure of FIG. 1 delineated by line 5—5.

Referring now to FIG. 5 there is shown the circuit diagram for the analog processor 42. Analog processor 42 receives as inputs from the latches 91 and 92 the two 8-bit digital words representing the fringe radii and produces an output voltage proportional to the fractional interferometer fringe order $\epsilon$. The equation of the processor is:

$$\text{fractional fringe order } \epsilon = r_1^2/r_2^2 - r_1^2$$

where $r_1$ and $r_2$ are the radii digital words derived from latches 91 and 92.

Digital-to-analog converters 101 and 102 receive the respective radii words from the latches 91 and 92 and their analog outputs as derived from the outputs of differential amplifiers 102 to provide output voltages which are proportional to the respective digital word inputted ot the respective digital-to-analog converters 101 and 102. Differential amplifiers 100 and their associated input potentiometers and Zener diodes are used as precision reference sources of $\nu_1$ and $\nu_2$ for the digital-to-analog converters 101 and 102.

The analog outputs of the respective digital-to-analog converters 101 and 102 are fed via voltage divider and potentiometer networks 104 and 105, respectively, into squaring circuits 106 and 107, such as a Model AD583 integrated circuit. Adjustment of the respective potentiometer networks 104 and 105 serves to adjust the scale factor for the $r_1$ and $r_2$ analog signals, respectively, as inputted to the squarers 106 and 107. The outputs of squarers 106 and 107 are scaled to be proportional to $10r_1^2/(255)^2$ and $10r_2^2/(255)^2$, respectively. The output of squarer 107 is fed to the input of a unity gain non-inverting buffer 109. The outputs of buffers 108 and 109 are fed into an inverting summing buffer 110 to produce an output equal to $10(r_2^2 - r_1^2)/(255)^2$. This output is applied to a precision divider 111 as the denominator while the output of squarer 106 is applied as the numerator. The output of the divider 111 is then buffered by buffer amplifier 112 and then precision scaled to $r_1^2/(r_2^2 - r_1^2)$ via adjustable voltage divider network 113 to derive an output voltage at terminal 114 corresponding to $\epsilon$, the fractional fringe order signal, which is thence fed to the digital voltmeter display 43.

What is claimed is:

1. In an optical wavelength meter:
    first and second Fabry-Perot etalon interferometer means disposed to receive light of a wavelength to be measured and for transforming the light into first and second interference fringe patterns of spatially separated lines of brightness of light, each of said first and second fringe patterns having a spatial separation related to substantially different free spectral ranges of wavelengths of the light to be measured; and
    detector means responsive to said first and second interference patterns for producing first and second outputs which are functions of the spatial separations of the brightness lines of said first and second interference patterns respectively, said first and second outputs each corresponding to said substantially different free spectral ranges of said first and second interferometer means and each of said first and second outputs corresponding to substantially different degrees of resolution so that the wave number of the light to be measured by said second interferometer means and to a second degree of resolution is predetermined to a first degree of resolution lower than said second degree of resolution by said output derived from said first interferometer means.

2. The apparatus of claim 1 wherein said detector means includes an array of photosensitive diode means disposed to receive at least a plurality of the brightness lines of said interference pattern, and means for correlating the response of respective ones of said diode means of said array to respective ones of the brightness lines of said interference pattern incident thereon for deriving an output which is a function of the spatial period of the interference brightness line pattern incident on said array of diode means; and calculator means responsive to the spatial period output of said diode array for calculating a fractional fringe order quantity for each of said interference fringe brightness patterns.

3. The apparatus of claim 1 wherein each of said Fabry-Perot etalon interferometer means includes first and second planar mirror means for at least partially reflecting light therebetween and being partially transmissive to the light to be measured; spacer means for accurately spacing apart said first and second mirror means in fixed parallel relation, and thermally conductive enclosure means for enclosing said mirror and spacer means in substantially isothermal relation.

4. The apparatus of claim 3 including gas fill means filling the space between said first and second mirror means at subatmospheric pressure, said gas fill means having a density and refractive index so as to compensate for small errors in the spacing between said first and second mirror means as determined by the dimensions of said spacer means.

5. The apparatus of claim 3 wherein said mirror means are optically contacted to opposite axially spaced surfaces of said spacer means.

6. The apparatus of claim 3 wherein each of said mirror means comprises a substrate having reflective coatings of silver formed thereon.

7. The apparatus of claim 1 including nomochromator means disposed along the path of light to be measured between the source of light to be measured and said first and second Fabry-Perot interferometer means for serving as a bandpass filter for passing a wavelength of the light to be measured to said interferometer means and for determining the wave number or wavelength of the light to be measured, to a first relatively low degree of resolution.

8. The apparatus of claim 7 including display means for displaying the bandpass spectrum of the light to be measured as passed by said monochromator means.

9. The apparatus of claim 7 including calibration light source means for supplying light of known wavelength into and along the path of light to be measured for calibrating the optical wavelength meter.

* * * * *